Patented Apr. 23, 1929.

1,710,472

UNITED STATES PATENT OFFICE.

CHARLES WOODLAND CHITTY AND DOUGLAS WILLIAM KENT-JONES, OF DOVER, ENGLAND, ASSIGNORS TO WOODLANDS LIMITED, OF DOVER, ENGLAND, A BRITISH COMPANY.

HEAT TREATMENT OF CEREAL SUBSTANCES.

No Drawing. Application filed June 28, 1926, Serial No. 119,229, and in Great Britain July 24, 1925.

This invention comprises improvements in or relating to the heat treatment of cereal substances and is in the nature of a development of the invention described in United States Letters Patent No. 1,634,259, granted July 5, 1927, to Robert Hutchinson. According to the said specification flour or wheat is dry-heated to a point at which substantially all the contained gluten is rendered non-retainable in a washing test, and a proportion of the cereal so treated is blended with a proportion of cereal not so treated, with the result that the blend possesses superior strength as compared with untreated flour or wheat.

We have found by experiment that if the treatment described in the prior specification is merely carried to the point at which all the gluten is rendered non-retainable in a washing test it is necessary to blend the treated flour into the untreated flour in a proportion of approximately 15% or more in order to obtain any substantial advantage by the process.

We have now found, however, that if the heat treatment is continued for a considerably longer period as set forth hereinafter, it necessarily follows that the cereal undergoes a marked physico-chemical change and the gluten is so affected that the flour can no longer be made into what is acceptable as a dough but makes more of a plastic mass when moistened with water, and it becomes possible to obtain similar increases in strength by the employment of such smaller quantities of heat-treated wheat or flour and in fact the cereal can be brought to a point at which its action is very similar to that of the well-known "improvers" which are frequently added to the flour for the purpose of increasing its strength. Normal flour when blended with water and kneaded produces a substance that may be said to be acceptable as a dough, that is to say it has elasticity and resilience and when fermented the capacity to retain much of the gas generated by the fermentation. Flour, when heated by the process hereinafter to be described, will not when mixed with water and kneaded, produce an elastic, resilient substance, but becomes a plastic putty-like mass.

The present invention comprises a process of heat treatment of a wheaten cereal wherein the cereal is dry-heated for a time considerably longer than that necessary to render the whole of the gluten non-retainable in a washing test so that the cereal acquires the property of markedly increasing the strength of flour when mixed therewith in the form of flour in proportions less than 15% of the resulting blend (for example down to 1% or less).

The heat treatment may exceed seven hours at a temperature lying between 170 and 200° F. If the temperature is less than that mentioned the time taken to obtain the results is somewhat excessive and involves a corresponding waste of heat, while if the temperature is too elevated there is a tendency for the flour to become sufficiently affected in colour to impart a tinge to flour with which it is blended. At the higher temperatures the period required is shorter. Preferably the cereal is heated in the form of flour, as the best results have been so obtained. The best flours to employ are glutinous flours. Wheat in berry form, however, or the products intermediate between wheat and flour, such as semolina, can be employed if desired.

By the term "dry-heating" in this specification it is intended to exclude heating in an atmosphere of steam, or an atmosphere containing considerable quantities of water-vapour, such heating having the effect of gelatinizing the starch in the cereal. The process according to the present invention does not involve gelatinization of the starch, which is deleterious to the desired effect and must not be allowed to take place to any substantial extent. Nevertheless the wheat or flour may contain a certain amount of moisture, as is usual with cereal substances. Preferably such moisture is limited so as not to exceed 15% during the heating and the period of heating is limited so that the starch in the cereal is not gelatinized notwithstanding the presence of the moisture.

It is preferred to limit the temperature of treatment so as not to exceed 185° F.

In one example of carrying this invention into effect Manitoba flour was heated to a temperature of 180° F. for 8 hours. It was then found that the addition of the so heated flour to ordinary flour in a proportion of 2 lbs. per sack of flour led to a striking increase in the "strength" of the whole flour, similar to that which would be obtained by the addition of a chemical "improver", but of course without being subject to the objections which are raised in some quarters against the use of chemicals in flour. Similar results have been obtained by a treatment at 212° F. for 6 hours.

In another example of the process the flour was heated at the same temperature for 60 hours and as a result it was found that 1½ lbs. per sack of the treated flour was sufficient as an addition to ordinary flour to effect the desired increase in "strength". However, it will be evident that it is more economical to heat as hereinabove described for 8–10 hours and use a slightly larger quantity of flour.

It is to be noted that owing to the very much smaller quantity of the improver required to produce a given effect according to the present invention, less actual heat is needed for producing the improvement than is expended in the treatment according to the said prior U. S. Patent Ser. No. 728,419.

We claim:

1. The process of making a flour strengthener from a cereal, comprising dry-heating a wheaten cereal a sufficient length of time and at a sufficiently high temperature to heat-treat the cereal beyond that necessary to make the gluten non-retainable in a washing test and to so change the physical properties of the cereal, that it can no longer be made when mixed with water into what is accepted as a dough, but merely into a plastic mass.

2. The process of making a flour strengthener from a cereal, comprising dry-heating a wheaten cereal for at least seven hours at a temperature lying between 170° and 200° F., to heat-treat the cereal beyond that necessary to make the gluten non-retainable in a washing test and to so change the physical properties of the cereal, that it can no longer be made when mixed with water into what is accepted as a dough, but merely into a plastic mass.

3. The process of making a flour strengthener from a cereal, comprising dry-heating a wheaten cereal in the form of flour a sufficient length of time and at a sufficiently high temperature to so change the physical properties of the cereal, that it can no longer be made when mixed with water into what is accepted as a dough, but merely into a plastic mass.

4. The process of making a flour strengthener from a cereal, comprising dry-heating a wheaten cereal in which the water content does not exceed 15% during the heating, a sufficient length of time and at a sufficiently high temperature without gelatinization to so change the physical properties of the cereal, that it can no longer be made when mixed with water into what is accepted as a dough, but merely into a plastic mass.

5. The process of making a flour strengthener from a cereal, comprising dry-heating a wheaten cereal for at least seven hours at a temperature not to exceed 185° F., to so change the physical properties of the cereal, that it can no longer be made when mixed with water into what is accepted as a dough, but merely into a plastic mass.

6. The method of improving the baking qualities of flour, comprising making a strengthener from a wheaten cereal by dry-heating a wheaten cereal a sufficient length of time and at a sufficiently high temperature to so change the physical properties of the cereal, that it can no longer be made when mixed with water into what is accepted as a dough, but merely a plastic mass, and then mixing the strengthener with the flour to be improved in proportions less than 15% of the resulting blend (for example, down to 1% or less).

7. A cereal improver for flour, formed from a wheaten cereal whose physical properties have been so changed by heat treatment, that it can no longer be made when mixed with water into what is accepted as dough, but merely into a plastic mass.

8. A flour containing less than 1% up to less than 15% of a wheaten cereal improver whose physical properties have been so changed by heat treatment, that it can no longer be made when mixed with water into what is accepted as dough, but merely into a plastic mass.

In testimony whereof we have signed our names to this specification.

CHARLES WOODLAND CHITTY.
DOUGLAS WILLIAM KENT-JONES.